US012778207B2

(12) United States Patent
Robert et al.

(10) Patent No.: US 12,778,207 B2
(45) Date of Patent: Nov. 3, 2026

(54) SYSTEM AND METHOD FOR TEMPERATURE CONTROL IN AN ELECTRICALLY HEATED AEROSOL-GENERATING DEVICE

(71) Applicant: Philip Morris Products S.A., Neuchatel (CH)

(72) Inventors: Jacques Robert, Le Mont-sur-Lausanne (CH); Jerome Christian Courbat, Cortaillod (CH); Michel Bessant, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 657 days.

(21) Appl. No.: 16/606,920

(22) PCT Filed: Apr. 12, 2018

(86) PCT No.: PCT/EP2018/059477
§ 371 (c)(1),
(2) Date: Oct. 21, 2019

(87) PCT Pub. No.: WO2018/202403
PCT Pub. Date: Nov. 8, 2018

(65) Prior Publication Data

US 2020/0046033 A1 Feb. 13, 2020

(30) Foreign Application Priority Data

May 3, 2017 (EP) .................................... 17169337

(51) Int. Cl.
*A24F 40/50* (2020.01)
*A24F 40/20* (2020.01)
(Continued)

(52) U.S. Cl.
CPC ............... *A24F 40/50* (2020.01); *H05B 3/42* (2013.01); *A24F 40/20* (2020.01); *H02J 7/96* (2026.01)

(58) Field of Classification Search
CPC .......... A24F 40/20; A24F 40/50; A24F 40/40; A24F 40/46; H05B 3/42; H02J 7/96
See application file for complete search history.

(56) References Cited

U.S. PATENT DOCUMENTS

| | | | | |
|---|---|---|---|---|
| 2007/0062526 A1* | 3/2007 | Schuster | A61M 16/1085 128/203.26 |
| 2013/0104916 A1* | 5/2013 | Bellinger | A61M 15/06 131/328 |

(Continued)

FOREIGN PATENT DOCUMENTS

| | | |
|---|---|---|
| CN | 104184180 A | 12/2014 |
| CN | 104470386 A | 3/2015 |

(Continued)

OTHER PUBLICATIONS

Office Action issued Apr. 11, 2022, in corresponding Japanese Patent Application No. 2019-556604 (with English Translation), 8 pages.

(Continued)

*Primary Examiner* — John J Norton
*Assistant Examiner* — Dilnessa B Belay
(74) *Attorney, Agent, or Firm* — Oblon, McClelland, Maier & Neustadt, L.L.P.

(57) ABSTRACT

An aerosol-generating device for generation of an inhalable aerosol is provided, the aerosol-generating device including a resistive heater; a battery, configured to generate a battery voltage (Vbat); and a control unit including a DC/DC converter configured to receive as an input the battery voltage (Vbat) from the battery and to output an output voltage (Vheater) to the resistive heater, and a microcon- (Continued)

troller configured to control the DC/DC converter to adjust the output voltage based on a predetermined temperature profile for the resistive heater that varies with time. A method of controlling an aerosol-generating device is also provided.

15 Claims, 5 Drawing Sheets

(51) Int. Cl.
*H02J 7/96* (2026.01)
*H05B 3/42* (2006.01)

(56) References Cited

U.S. PATENT DOCUMENTS

| | | | | |
|---|---|---|---|---|
| 2014/0299137 | A1* | 10/2014 | Kieckbusch | A24F 40/51 131/328 |
| 2014/0332016 | A1 | 11/2014 | Bellinger et al. | |
| 2015/0053217 | A1 | 2/2015 | Steingraber et al. | |
| 2016/0044963 | A1* | 2/2016 | Saleem | H05B 3/0014 131/328 |
| 2016/0057811 | A1* | 2/2016 | Alarcon | A24F 40/50 219/494 |
| 2017/0280779 | A1 | 10/2017 | Qiu | |

FOREIGN PATENT DOCUMENTS

| | | | | |
|---|---|---|---|---|
| EP | 2800486 A2 | | 11/2014 | |
| JP | 2006-304914 A | | 11/2006 | |
| JP | 2012-161146 A | | 8/2012 | |
| JP | 2015-524260 A | | 8/2015 | |
| RU | 2 606 711 C1 | | 1/2017 | |
| WO | WO 2013/102609 A2 | | 7/2013 | |
| WO | WO 2014/102091 A1 | | 7/2014 | |
| WO | WO 2016/115893 A1 | | 7/2016 | |
| WO | WO-2016166064 A1 | * | 10/2016 | A24F 40/10 |
| WO | WO 2017/057286 A1 | | 4/2017 | |

OTHER PUBLICATIONS

Combined Chinese Office Action and Search Report issued Dec. 29, 2021 in Chinese Patent Application No. 201880025536.5 (with English translation), 20 pages.

Extended European Search Report issued on Oct. 27, 2017, in Patent Application No. 17169337.7, 9 pages.

International Preliminary Report on Patentability issued on Sep. 6, 2019, in PCT/EP2018/059477, 15 pages.

Written Opinion issued on Apr. 26, 2019, in PCT/EP2018/059477, 7 pages.

International Search Report and Written Opinion issued Jul. 2, 2018 in PCT/EP2018/059477 filed Apr. 12, 2018.

Combined Notice of Allowance and Search Report issued Sep. 1, 2021 in Russian Patent Application No. 2019138048 (with English translation), 17 pages.

* cited by examiner

SYSTEM AND METHOD FOR TEMPERATURE CONTROL IN AN ELECTRICALLY HEATED AEROSOL-GENERATING DEVICE

The invention relates to heated aerosol-generating devices and in particular to temperature control for a heater within a battery powered aerosol-generating device.

Typically, in a heated, battery powered aerosol-generating device, an electrically resistive heating element is used to heat an aerosol-forming substrate. The aerosol-forming substrate comprises one or more volatile compounds that are vaporised by the resistive heating element and then cool to form an aerosol. The temperature of the resistive heating element plays a significant role in determining both the quantity and the quality of the aerosol produced. There is therefore a need in such devices to provide control of the temperature of heating elements within the device.

Furthermore, it is desirable to be able to control the temperature of the heating element to follow a particular temperature profile over time. Changes in the condition of the aerosol-forming substrate and changes in airflow through the device can mean that simply controlling the heating element to be at a single target temperature does not provide optimal results.

Typically, pulse width modulation (PWM) of the voltage supplied to the heating element or elements is used to control the temperature of the heating element. This provides simple and highly reactive control of the heating element temperature. However, there are a number of limitations to using pulse width modulation as the sole method for temperature control. It would be desirable to provide an alternative method and system for controlling the temperature of a heating element within an aerosol-generating system.

In a first aspect of the invention, there is provided a control unit for an aerosol-generating device, the aerosol-generating device comprising a resistive heater for heating an aerosol-forming substrate and a battery, wherein the battery is configured to generate a battery voltage, wherein said control unit comprises:

- a DC/DC converter arranged to receive as an input the battery voltage from the battery and to output an output voltage to the resistive heater; and
- a microcontroller configured to control said DC/DC converter to adjust the output voltage based on a predetermined temperature profile for the resistive heater.

Using a DC/DC converter to adjust the DC voltage applied to the resistive heater has significant advantages over using pulse width modulation (PWM) alone, particularly when the mass of the resistive heater is low. Although PWM control is relatively simple and inexpensive to implement, and is highly reactive, there is a danger with PWM control that a resistive heater will overheat during the ON periods if the mass of the resistive heater structure is not sufficient to effectively average the temperature between the ON and OFF periods. It is not desirable simply to increase the PWM frequency to mitigate this problem, because the efficiency of the device will drop when the PWM frequency becomes too high. Similarly, increasing the mass of the heater structure by incorporating a large heat transfer structure between the resistive heater element or elements and the aerosol-forming substrate to reduce temperature spikes at the aerosol-forming substrate brings its own problems. If the mass of the heater structure is too large the heater will take too long to heat up to the required operation temperature.

So finding the correct balance between the PWM control parameters and the structure of the resistive heater can be very difficult. Using PWM control effectively limits design freedom for the heater structure.

In contrast, using a DC/DC converter to control the voltage applied to the resistive heater in accordance with a target temperature profile allows for much greater flexibility in heater design and in particular allows for low heater mass.

There is another problem with PWM control when used with resistive heaters that have an electrical resistance that is low when they are cold. PWM means that the full battery voltage is delivered during the ON periods. At low temperature, when the device is first switched on, there is low heater resistance and so high current, which the battery may not be able to deliver, especially when the battery is cold too. This can lead to complete failure of the device.

The use of a DC/DC converter allows for control of the voltage across the heater and so control over the maximum current drawn from the battery.

As used herein the term DC/DC converter means an electronic circuit or electromechanical device that converts a source of direct current (DC) from one voltage level to another. The DC/DC converter may be, for example, a buck converter, a boost converter or a buck-boost converter. The DC/DC converter may comprise more than one power converter stage. Advantageously, the DC/DC converter is a programmable DC/DC converter.

The control unit may further comprise a digital potentiometer connected between the microcontroller and the DC/DC converter. The digital potentiometer may be used to set the output voltage from the DC/DC converter. The digital potentiometer may be programmable.

The control unit may further comprise a non-volatile memory storing the predetermined temperature profile or electrical resistance profile. The predetermined temperature or voltage profile may be stored in a look-up table. The memory may store further look-up tables or routines relating parameters of the heater or DC/DC converter to one another.

Advantageously, the microcontroller is configured to control said DC/DC converter based on a measured or calculated resistance or temperature of the resistive heater. In one embodiment, the electrically resistive heater has an electrical resistance that is dependent on its temperature. In that case, the microcontroller may be configured to control said DC/DC converter based on a calculated electrical resistance of the electrically resistive heater. The control unit may be configured to calculate the electrical resistance of the electrically resistive heater from voltage and current measurements.

In another embodiment, the control unit may comprise a temperature sensor connected to the microcontroller and positioned proximate to the electrically resistive heater. In that case, the microcontroller may be configured to control said DC/DC converter based on signals from the temperature sensor.

The microcontroller may be configured to operate a closed loop control scheme. The closed loop control scheme may be implemented as a routine in the firmware of the microcontroller. A closed loop control scheme may be appropriate for controlling heater temperature over a relatively long time period of, for example, a few minutes, as is required in continuously heated aerosol-generating systems. The closed loop control scheme may be arranged to control the DC/DC converter to adjust the temperature of the electrically resistive heater towards a target temperature. The target temperature may vary with time in accordance with a stored target temperature profile. The target temperature profile may be converted into a target resistance profile based on a temperature coefficient of resistance of the electrically resistive heater. The control unit may store the target resistance profile in a non-volatile memory or may generate the target resistance profile from a target temperature profile stored in a non-volatile memory.

The microcontroller may be configured to operate as a Proportional Integral Derivative (PID) controller to adjust the temperature of the electrically resistive heater towards a target temperature in a closed loop control scheme. Alternatively, the microcontroller may be configured to use predictive logic to adjust the temperature of the electrically resistive heater towards a target temperature in a closed loop control scheme.

Alternatively, the microcontroller may be configured to operate an open-loop control scheme. In that case, the control unit may store a target profile for a control value input to the DC/DC converter. The control value may determine the level of Vheater output from the DC/DC converter. The microcontroller may be configured to provide said DC/DC converter with a control value in accordance with the target profile for the control value. An open loop control scheme may be appropriate for controlling the electrically resistive heater for relative short time periods, such as a few seconds, in a puff actuated aerosol-generating system in which the heater is only supplied with power during user puffs.

The microcontroller may additionally be configured to adjust an average current supplied to the resistive heater from the DC/DC converter by controlling the operation of a switch connected in series with the resistive heater and the DC/DC converter. The microcontroller may be configured to use pulse width modulation control of the switch. So the microcontroller may be configured to operate a PWM control scheme in addition to control using the DC/DC converter. Principle temperature control may be performed using the DC/DC converter and, as it provides faster response, and the PWM control scheme may be used to fine tune the temperature.

The microcontroller may be configured to monitor a current through the resistive heater and control the DC/DC converter to ensure that the current through the resistive heater does not exceed a maximum current threshold. This prevents overloading of the battery, which could cause failure of the device.

The microcontroller may control the DC/DC converter to ensure that the battery voltage is maintained at or above a minimum battery voltage. The minimum battery voltage may be a minimum voltage required for operation of particular component or components within the device, such as the microcontroller. This ensures that components, and in particular the microcontroller, is always able to operate.

Alternatively, or in addition, the device may comprise a second voltage supply for the microcontroller. The second voltage supply may be a second battery or may be a voltage regulator, such as a second DC/DC converter or a linear dropout regulator (LDO), connected between the battery and the microcontroller. This can be used to ensure that the microcontroller and other electronic components receive a minimum required voltage.

The microcontroller may be any suitable microcontroller but is preferably programmable.

In a second aspect of the invention, there is provided an aerosol-generating device for generation of inhalable aerosol, the device comprising:

a resistive heater for heating an aerosol-forming substrate, a battery, wherein the battery is configured to generate a battery voltage, and a control unit in accordance with the first aspect of the invention.

The aerosol-generating device may be configured to receive an aerosol-forming substrate.

The resistive heater may comprise an electrically resistive material. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum platinum, gold and silver. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese-, gold- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required.

The aerosol generating device may comprise an internal resistive heater or an external resistive heater, or both internal and external resistive heaters, where "internal" and "external" refer to the aerosol-forming substrate. An internal resistive heater may take any suitable form. For example, an internal resistive heater may take the form of a heating blade. Alternatively, the internal resistive heater may take the form of a casing or substrate having different electro-conductive portions, or an electrically resistive metallic tube. Alternatively, the internal resistive heater may be one or more heating needles or rods that run through the centre of the aerosol-forming substrate. Other alternatives include a heating wire or filament, for example a Ni—Cr (Nickel-Chromium), platinum, tungsten or alloy wire or a heating plate. Optionally, the internal resistive heater may be deposited in or on a rigid carrier material. In one such embodiment, the electrically resistive heater may be formed using a metal having a defined relationship between temperature and resistivity. In such an exemplary device, the metal may be formed as a track on a suitable insulating material, such as ceramic material, and then sandwiched in another insulating material, such as a glass. Heaters formed in this manner may be used to both heat and monitor the temperature of the heating elements during operation.

An external resistive heater may take any suitable form. For example, an external resistive heater may take the form of one or more flexible heating foils on a dielectric substrate, such as polyimide. The flexible heating foils can be shaped to conform to the perimeter of the substrate receiving cavity. Alternatively, an external heating element may take the form of a metallic grid or grids, a flexible printed circuit board, a moulded interconnect device (MID), ceramic heater, flexible carbon fibre heater or may be formed using a coating technique, such as plasma vapour deposition, on a suitable shaped substrate. Other techniques, such as evaporation, chemical etching, laser etching, screen-printing, gravure printing, and inkjet printing may also be used to form the heater. An external resistive heater may also be formed using a metal having a defined relationship between temperature and resistivity. In such an exemplary device, the metal may be formed as a track between two layers of suitable insulating materials. An external resistive heater formed in this manner may be used to both heat and monitor the temperature of the external heating element during operation.

The resistive heater advantageously heats the aerosol-forming substrate by means of conduction. The resistive heater may be at least partially in contact with the substrate, or the carrier on which the substrate is deposited. Alternatively, the heat from either an internal or external heater may be conducted to the substrate by means of a heat conductive element.

The resistive heater may have a mass between 0.1 g and 0.5 g, and more preferably between 0.15 g and 0.25 g. The battery may be a rechargeable battery. The battery may be a lithium ion battery, for example a Lithium-Cobalt, a Lithium-Iron-Phosphate, Lithium Titanate or a Lithium-Polymer battery. Alternatively, the battery may another form of rechargeable battery, such as a Nickel-metal hydride battery or a Nickel cadmium battery.

The microcontroller may configured to continuously supply current to the resistive heater from the DC/DC converter for a period of more than 5 seconds. The microcontroller may be configured to control the DC/DC converter based on a target temperature profile that varies with time following activation of the device.

As used herein, an 'aerosol-generating device' relates to a device that interacts with an aerosol-forming substrate to generate an aerosol. The aerosol-forming substrate may be part of an aerosol-generating article. An aerosol-generating device may be a device that interacts with an aerosol-forming substrate of an aerosol-generating article to generate an aerosol that is directly inhalable into a user's lungs thorough the user's mouth. The aerosol-forming substrate may be fully or partially contained within the device.

The aerosol-forming substrate may be a solid aerosol-forming substrate. Alternatively, the aerosol-forming substrate may be a liquid or may comprise both solid and liquid components. The aerosol-forming substrate may comprise a tobacco-containing material containing volatile tobacco flavour compounds which are released from the substrate upon heating. Alternatively, the aerosol-forming substrate may comprise a non-tobacco material. The aerosol-forming substrate may further comprise an aerosol former. Examples of suitable aerosol formers are glycerine and propylene glycol.

If the aerosol-forming substrate is a solid aerosol-forming substrate, the solid aerosol-forming substrate may comprise, for example, one or more of: powder, granules, pellets, shreds, spaghettis, strips or sheets containing one or more of: herb leaf, tobacco leaf, fragments of tobacco ribs, reconstituted tobacco, homogenised tobacco, extruded tobacco, cast leaf tobacco and expanded tobacco. The solid aerosol-forming substrate may be in loose form, or may be provided in a suitable container or cartridge. Optionally, the solid aerosol-forming substrate may contain additional tobacco or non-tobacco volatile flavour compounds, to be released upon heating of the substrate. The solid aerosol-forming substrate may also contain capsules that, for example, include the additional tobacco or non-tobacco volatile flavour compounds and such capsules may melt during heating of the solid aerosol-forming substrate.

Optionally, the solid aerosol-forming substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fibre mat, a low mass open mesh metallic screen, or a perforated metallic foil or any other thermally stable polymer matrix.

The solid aerosol-forming substrate may be deposited on the surface of the carrier in the form of, for example, a sheet, foam, gel or slurry. The solid aerosol-forming substrate may be deposited on the entire surface of the carrier, or alternatively, may be deposited in a pattern in order to provide a non-uniform flavour delivery during use.

Although reference is made to solid aerosol-forming substrates above, it will be clear to one of ordinary skill in the art that other forms of aerosol-forming substrate may be used with other embodiments. For example, the aerosol-forming substrate may be a liquid aerosol-forming substrate. If a liquid aerosol-forming substrate is provided, the aerosol-generating device preferably comprises means for retaining the liquid. For example, the liquid aerosol-forming substrate may be retained in a container. Alternatively or in addition, the liquid aerosol-forming substrate may be absorbed into a porous carrier material. The porous carrier material may be made from any suitable absorbent plug or body, for example, a foamed metal or plastics material, polypropylene, terylene, nylon fibres or ceramic. The liquid aerosol-forming substrate may be retained in the porous carrier material prior to use of the aerosol-generating device or alternatively, the liquid aerosol-forming substrate material may be released into the porous carrier material during, or immediately prior to use. For example, the liquid aerosol-forming substrate may be provided in a capsule. The shell of the capsule preferably melts upon heating and releases the liquid aerosol-forming substrate into the porous carrier material. The capsule may optionally contain a solid in combination with the liquid. Alternatively, the carrier may be a non-woven fabric or fibre bundle into which tobacco components have been incorporated. The non-woven fabric or fibre bundle may comprise, for example, carbon fibres, natural cellulose fibres, or cellulose derivative fibres.

During operation, the aerosol-forming substrate may be completely contained within the aerosol-generating device. In that case, a user may puff on a mouthpiece of the aerosol-generating device. Alternatively, during operation an aerosol-forming article containing the aerosol-forming substrate may be partially contained within the aerosol-generating device. In that case, the user may puff directly on the aerosol-forming article.

The aerosol-forming article may be substantially cylindrical in shape. The aerosol-forming article may be substantially elongate. The aerosol-forming article may have a length and a circumference substantially perpendicular to the length. The aerosol-forming substrate may be substantially cylindrical in shape. The aerosol-forming substrate may be substantially elongate. The aerosol-forming substrate may also have a length and a circumference substantially perpendicular to the length.

The aerosol-forming article may have a total length between approximately 30 mm and approximately 100 mm. The aerosol-forming article may have an external diameter between approximately 5 mm and approximately 12 mm. The aerosol-forming article may comprise a filter plug. The filter plug may be located at the downstream end of the aerosol-forming article. The filter plug may be a cellulose acetate filter plug. The filter plug is approximately 7 mm in length in one embodiment, but may have a length of between approximately 5 mm to approximately 10 mm.

In one embodiment, the aerosol-forming article has a total length of approximately 45 mm. The aerosol-forming article may have an external diameter of approximately 7.2 mm. Further, the aerosol-forming substrate may have a length of approximately 10 mm. Alternatively, the aerosol-forming substrate may have a length of approximately 12 mm. Further, the diameter of the aerosol-forming substrate may be between approximately 5 mm and approximately 12 mm. The aerosol-forming article may comprise an outer paper wrapper. Further, the aerosol-forming article may comprise a separation between the aerosol-forming substrate and the filter plug. The separation may be approximately 18 mm, but may be in the range of approximately 5 mm to approximately 25 mm.

The device is preferably a portable or handheld device that is comfortable to hold between the fingers of a single hand. The device may be substantially cylindrical in shape and has a length of between 70 and 200 mm. The maximum diameter of the device is preferably between 10 and 30 mm. In one embodiment the device has a polygonal cross section and has a protruding button formed on one face. In this embodiment, the diameter of the device is between 12.7 and 13.65 mm taken from a flat face to an opposing flat face; between 13.4 and 14.2 taken from an edge to an opposing edge (i.e., from the intersection of two faces on one side of the device to a corresponding intersection on the other side), and between 14.2 and 15 mm taken from a top of the button to an opposing bottom flat face.

In a third aspect of the invention, there is provided a method of controlling an aerosol-generating device, the aerosol-generating device comprising a resistive heater, a battery, wherein the battery is configured to generate a battery voltage, and a control unit, the control unit comprising a DC/DC converter arranged to receive as input the battery voltage from the battery and to output an output voltage to the resistive heater, the method comprising:

controlling said DC/DC converter to adjust the output voltage based on a predetermined temperature profile for the resistive heater.

Advantageously, the method may comprise controlling said DC/DC converter based on a measured or calculated resistance or temperature of the resistive heater. In one embodiment, the electrically resistive heater has an electrical resistance that is dependent on its temperature. In that case, the method may comprise controlling said DC/DC converter based on a calculated electrical resistance of the electrically resistive heater. The method may further comprise calculating the electrical resistance of the electrically resistive heater from voltage and current measurements.

The method may comprise operating a closed loop control scheme. The closed loop control scheme may be implemented as a routine in the firmware of a microcontroller. A closed loop control scheme may be appropriate for controlling heater temperature over a relatively long time period of a few minutes, as is required in continuously heated aerosol-generating systems. The closed loop control scheme may be arranged to control the DC/DC converter to adjust the temperature of the electrically resistive heater towards a target temperature. The target temperature may vary with time in accordance with a stored target temperature profile. The target temperature profile may converted into a target resistance profile based on a temperature coefficient of resistance of the electrically resistive heater.

The method may comprise operating a Proportional Integral Derivative (PID) controller to adjust the temperature of the electrically resistive heater towards a target temperature in a closed loop control scheme. Alternatively, the method may comprise using predictive logic to adjust the temperature of the electrically resistive heater towards a target temperature in a closed loop control scheme.

Alternatively, the method may comprise operating an open-loop control scheme. An open loop control scheme may be appropriate for controlling the electrically resistive heater for relative short time periods, such as in a puff actuated aerosol-generating system in which the heater is only supplied with power during user puffs.

The method may additionally comprise adjusting an average current supplied to the resistive heater from the DC/DC converter by controlling the operation of a switch connected in series with the resistive heater and the DC/DC converter. The method may comprise operating the switch to provide pulse width modulation of the current supplied to the resistive heater. This technique may be used to provide fine tuning of the voltage control provided by the DC/DC converter.

The method may comprise monitoring a current through the resistive heater and controlling the DC/DC converter to ensure that the current through the resistive heater does not exceed a maximum current threshold. This prevents overloading of the battery, which could cause failure of the device.

The method may comprise controlling the DC/DC converter to ensure that the battery voltage is maintained at or above a minimum battery voltage. The minimum battery voltage may be a minimum voltage required for operation of particular component or components within the device, such as a microcontroller. Alternatively, or in addition, the method may comprise operating a second voltage supply for the microcontroller. The second voltage supply may be a second battery or may be a voltage regulator, such as a second DC/DC converter or a low dropout regulator (LDO), connected between the battery and the microcontroller.

In a fourth aspect of the invention, there is provided a computer program which, when run on programmable electric circuitry in a control unit of an electrically operated aerosol generating device, the aerosol-generating device comprising a resistive heater, a battery, wherein the battery is configured to generate a battery voltage, and a control unit, the control unit comprising a DC/DC converter arranged to receive as input the battery voltage from the battery and to output an output voltage to the resistive heater, causes the programmable electric circuitry to perform a method according to the third aspect of the invention.

Although the disclosure has been described by reference to different aspects, it should be clear that features described in relation to one aspect of the disclosure may be applied to the other aspects of the disclosure. In particular, aspects described in relation to the first aspect of the invention may be applied to the second and third aspects of the invention.

Examples of the invention will now be described in detail with reference to the accompanying drawings, in which.

Figure 1:
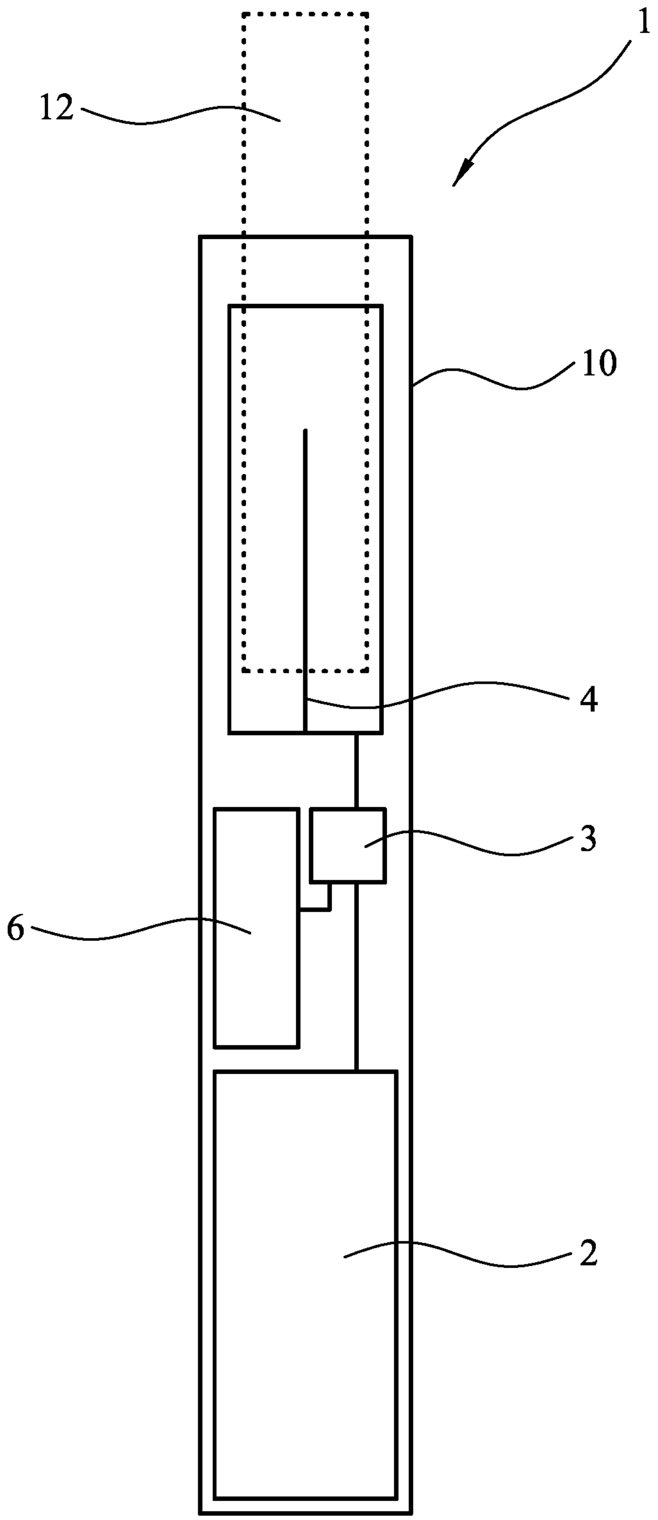
FIG. 1 is a schematic illustration of a device in accordance with an embodiment of the invention.

In FIG. 1 the components of an embodiment of an electrically heated aerosol generating device 1 are shown in a simplified manner. The elements of the electrically heated aerosol generating device 1 are not drawn to scale in FIG. 1. Elements that are not relevant for the understanding of this embodiment have been omitted to simplify FIG. 1.

The electrically heated aerosol generating device 1 comprises a housing 10 and an aerosol-forming substrate 12, for example an aerosol-forming article such as a cigarette. The aerosol-forming substrate 12 is pushed inside the housing 10 to come into thermal proximity with a heater 4. In this example, the heater is a blade that extends into the aerosol-forming substrate The aerosol-forming substrate 12 will release a range of volatile compounds at different temperatures. By controlling the operation temperature of the heater to be below the release temperature of some of the volatile compounds, the release or formation of these smoke constituents can be avoided. Typically the aerosol-forming substrate is heated to a temperature of between 170 and 450 degrees centigrade. In one embodiment, the aerosol-forming substrate is heated to a temperature of between 170 and 250 degrees centigrade, and preferably between 180 and 240 degrees centigrade. In another embodiment, the aerosol-forming substrate is heated to a temperature of between 240 and 450 degrees centigrade, and preferably between 250 and 350 degrees centigrade. Within the housing 10 there is a battery 2, for example a rechargeable lithium ion battery. A control unit 3 is connected to the heating element 4, the electric battery 2, and a user interface 6, for example a button or display. This type of system is described in EP2800486 for example.

The control unit 3 controls the power supplied to the heating element 4 in order to regulate its temperature. It may be desirable to vary the temperature over the course of a single use of the device. In one example, it is desirable to increase the temperature rapidly immediately following activation of the device to minimise the time taken for a first puff to be available and then to reduce the temperature of the heater so that the substrate is maintained at constant temperature for the next few puffs. It may then be desirable to increase the temperature of the heater as the aerosol-forming substrate becomes depleted in order to ensure that sufficient aerosol is still being delivered to the user. This type of heating profile is described in detail in WO2014/102091.

Figure 2:
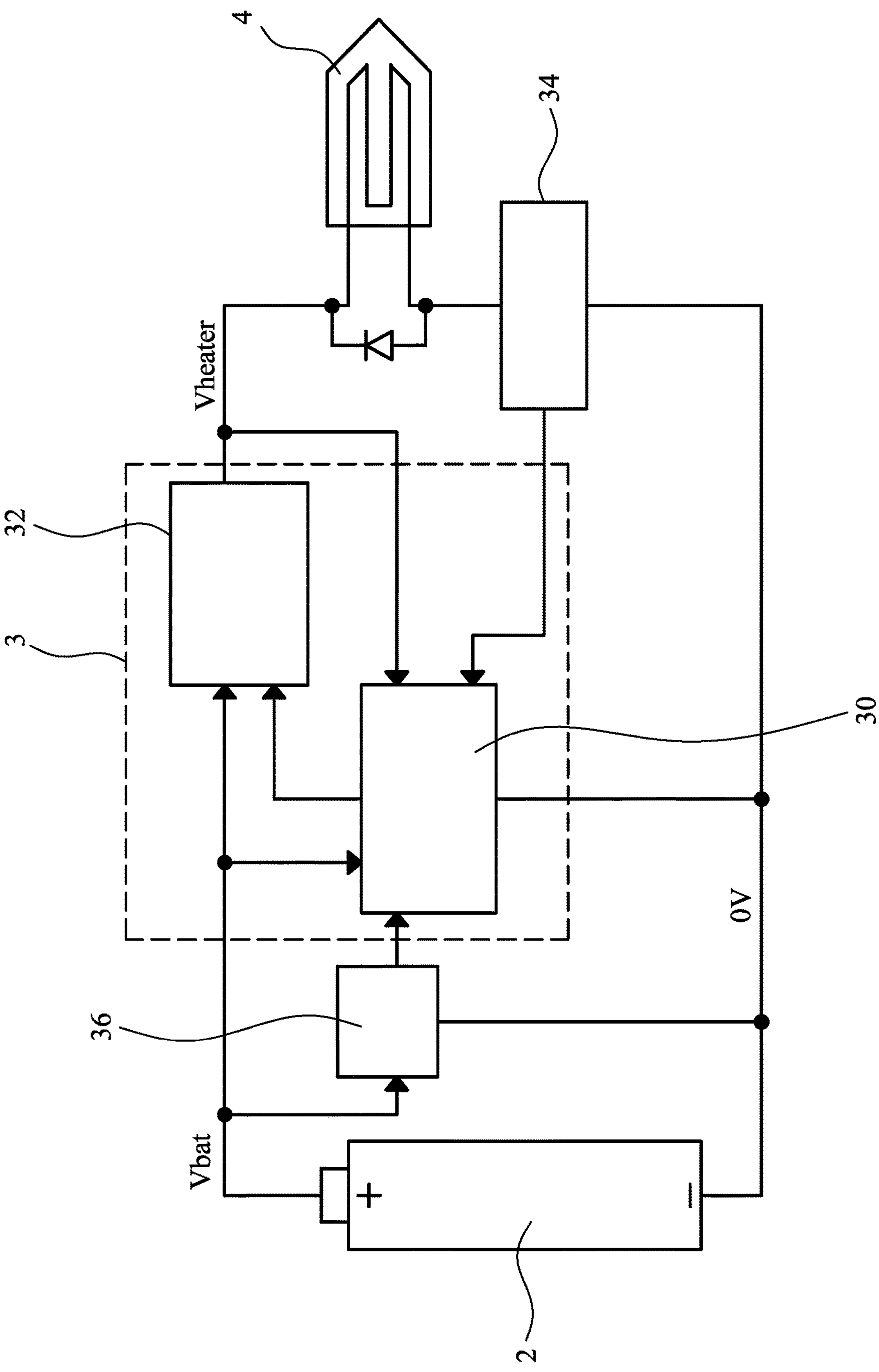
FIG. 2 is a schematic diagram illustrating the components of the device involved in controlling the temperature of the heater.

FIG. 2 illustrates the components of the device involved in controlling the temperature of the heater. In particular, FIG. 2 shows the arrangement of the battery 2, control unit 3 and heater 4. The control unit comprises a microcontroller 30 and a digitally controlled DC/DC converter 32. The digitally controlled DC/DC converter 32 is connected between the battery 2 and the heater 4 and is controlled by the microcontroller 30. The DC/DC converter receives at its input the battery output voltage (Vbat) and outputs an output voltage (Vheater). In this example, the DC/DC converter is a buck, or step-down, converter so that Vheater is lower than or equal to Vbat. But the invention may be implemented using, for example, a boost converter or a buck-boost converter or a combination of power converter stages.

The heater 4 comprises a plurality of electrically resistive tracks on a substrate. The heater tracks may be formed from platinum and the substrate may be a ceramic material, such as zirconia. The substrate is shaped as a blade to allow it to easily penetrate, and be removed from, an aerosol-forming substrate.

The microcontroller controls the digitally controlled DC/DC converter in order that the heater follows a desired temperature profile. In this embodiment, a closed-loop control scheme is used based on the heater resistance. The electrical resistance of the platinum heater tracks is directly related to the temperature of the heater by the temperature coefficient of resistance of platinum. The microcontroller receives a measurement of Vheater and a measurement of the current through the heater. A current measurement block 34 is shown connected between the heater and ground, with an output connected to the microcontroller 30. The current measurement block 34 may comprise a shunt resistor (with a very low resistance) in series with the heater 4. The current through the shunt resistor, which is also the current through the heater, can be measured using an amplifier connected in parallel to the shunt resistor. The resistance of the heater then calculated using Ohm's law.

Figure 3:
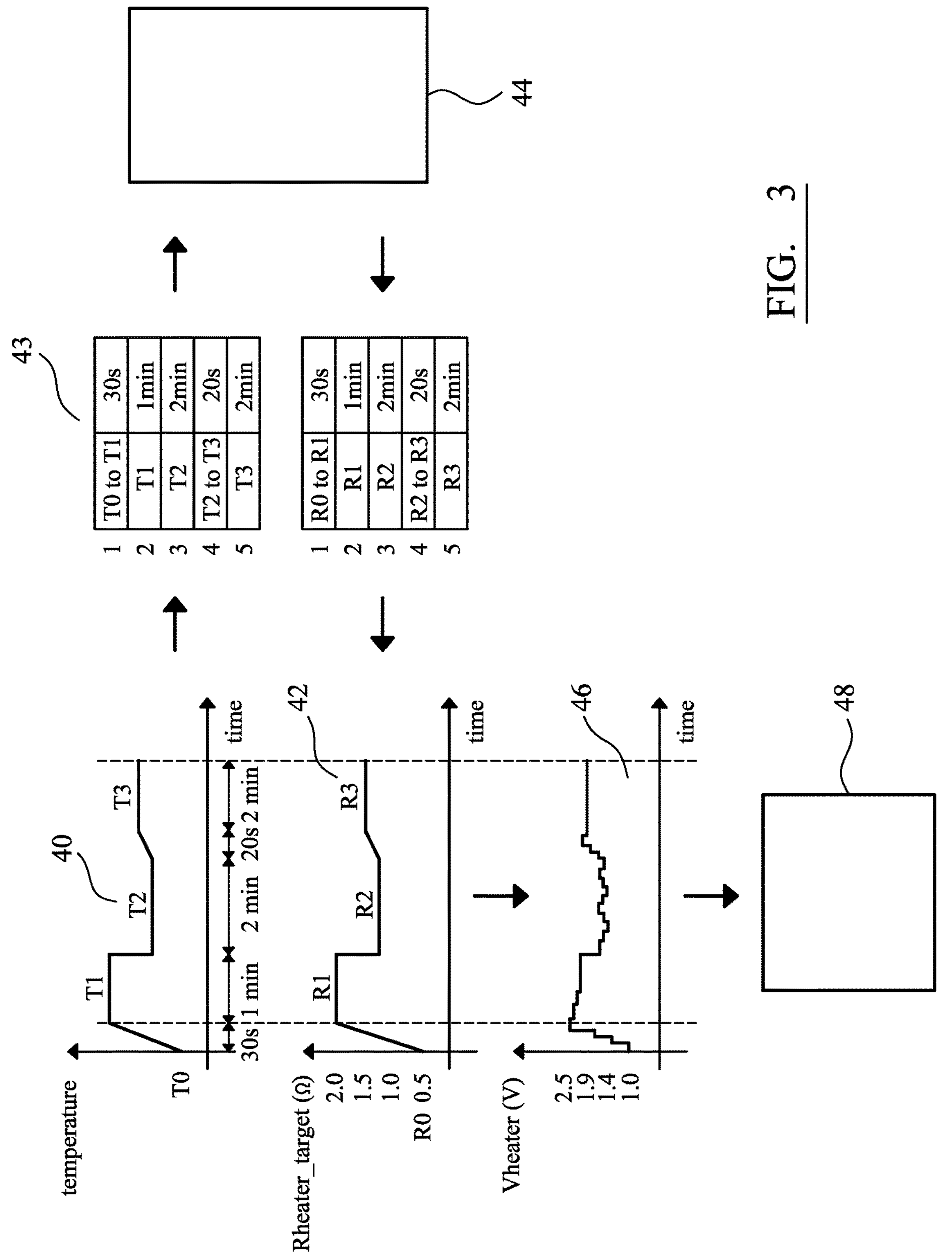
FIG. 3 illustrates an example temperature profile for the resistive heater and corresponding resistance and generated voltage profiles.

Referring to FIG. 3, the microcontroller stores a desired temperature profile, illustrated in graph 40, and stored as a look-up table 41. Graph 40 illustrates target heater temperature versus time following activation of the device. In this example, the temperature profile comprises five distinct phases. In a first phase, the heater is raised from an ambient temperature T0 to an initial target temperature T1. This first phase has a duration of 30 seconds. In a second phase, having a duration of one minute, the temperature of the heater is maintained at T1. In a third phase the temperature is dropped and maintained at a second target temperature T2. The third phase has a duration of two minutes. In a fourth phase, having a duration of 20 seconds, the temperature is gradually raised to a third target temperature T3. In a final phase, of a further 2 minutes, the heater is maintained at temperature T3. Following the final phase power to the heater is switched off.

In order to carry out a closed loop control scheme based on this temperature profile, the microcontroller converts the target temperature profile into a corresponding target electrical resistance profile based on the relationship between temperature and electrical resistance for the heater. The resistance profile is illustrated as graph 42 and as look-up table 43. A look-up table 44 may be stored in the microprocessor for converting the temperature profile to an electrical resistance profile.

It is not always necessary to store a desired temperature profile in the form of temperature values. It may be beneficial in some embodiments instead to store a desired electrical resistance profile. This is a temperature profile, simply converted to a resistance profile before being stored on the device. If the heater is not replaceable, storing a resistance profile may be preferable as it reduces data storage requirements and processing steps on the device. However, particularly if the heater is replaceable, it may be beneficial to store a temperature profile on the device and then convert that to a resistance profile on the device, as it is the temperature that ultimately must be controlled. When a heater is replaced, the new heater may have a temperature coefficient of resistance different to the previous heater.

The closed loop control scheme is then used to bring the heater resistance towards the target resistance. The resulting voltage output Vheater is illustrated in graph 46.

Figure 4:
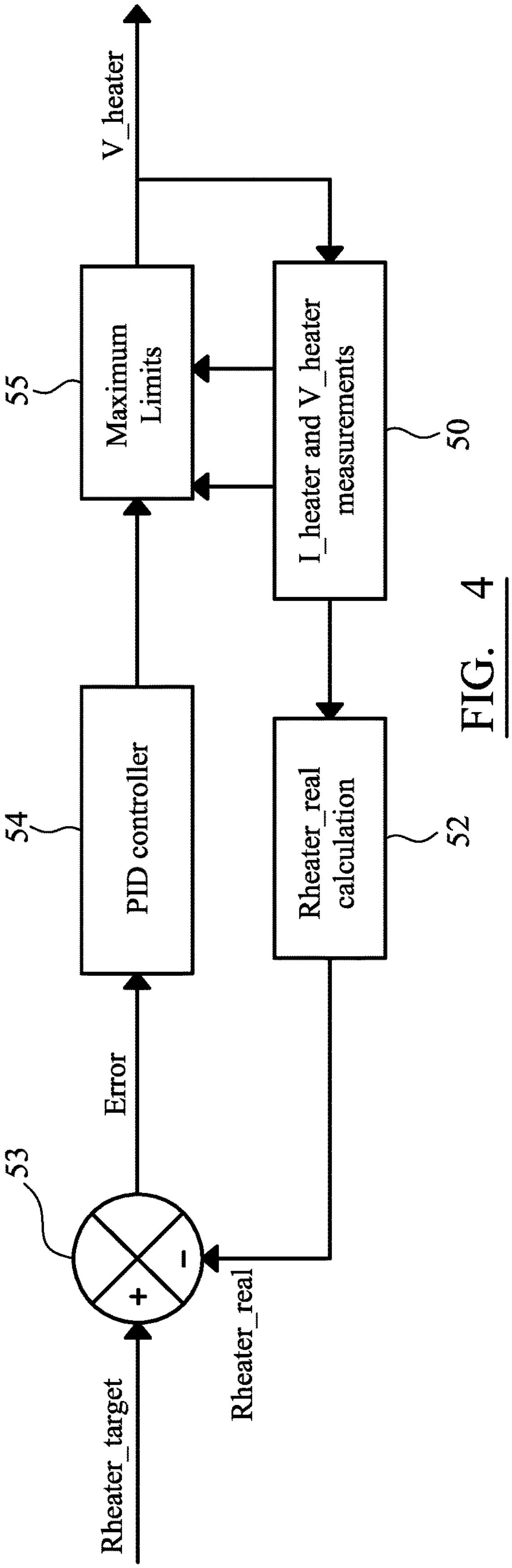
FIG. 4 illustrates a PID based control loop for heater voltage.

FIG. 4 illustrates a first example of a closed loop control scheme that may be implemented by the microprocessor. In a first step 50, the measurement of the current through the heater and the measurement of Vheater are received. In a second step 52, the measurements are used to calculate the electrical resistance of the heater. The calculated heater resistance is compared with the target resistance in step 53 and the difference is output to a Proportional, Integral, Derivative (PID) controller in step 54. The output of the PID controller is a required value for Vheater to bring the electrical resistance of the heater towards the target resistance. Using a PID controller is a well-known technique for closed loop control. The PID controller has fixed parameters, independent of heater temperature or resistance. Before the output of the PID controller is used to control the DC/DC converter it is first checked if the current or the voltage through the heater or required output from the DC/DC converter is greater than predetermined maximum limits. If the current through the heater is greater than maximum current that the battery can deliver, then in step 55 the required value for Vheater is set to the product of the maximum allowable current and the calculated heater resistance. If the value of Vheater calculated by the PID controller is greater than can be provided by the DC/DC converter, then Vheater is set to the maximum output voltage of the DC/DC converter.

The digitally controlled DC/DC converter comprises programmable DC/DC converter and digital potentiometer. The microcontroller is connected to the digital potentiometer and it is the digital potentiometer that sets the output voltage of the programmable DC/DC converter. The DC/DC feedback pin of the DC/DC converter is connected to the digital potentiometer and it is the value on this feedback pin that determines level of Vheater output from the DC/DC converter. Referring again to FIG. 3, the voltage profile shown in graph 46 is converted to a value to be applied to the DC/DC feedback pin using look up table 48. Look up table 48 may relate Vheater to a value to be applied to the DC/DC feedback pin in steps of 0.05V, for example. By changing the value of the digital potentiometer the DC/DC automatically adjusts the value of Vheater to the desired level. With this arrangement it is possible to adjust the value of Vheater in less than 10 milliseconds. The digital potentiometer is controlled by the microcontroller though a Serial Peripheral Interface (SPI) in this example, but could also be controlled through I2C or a parallel bus, for example.

Figure 5:
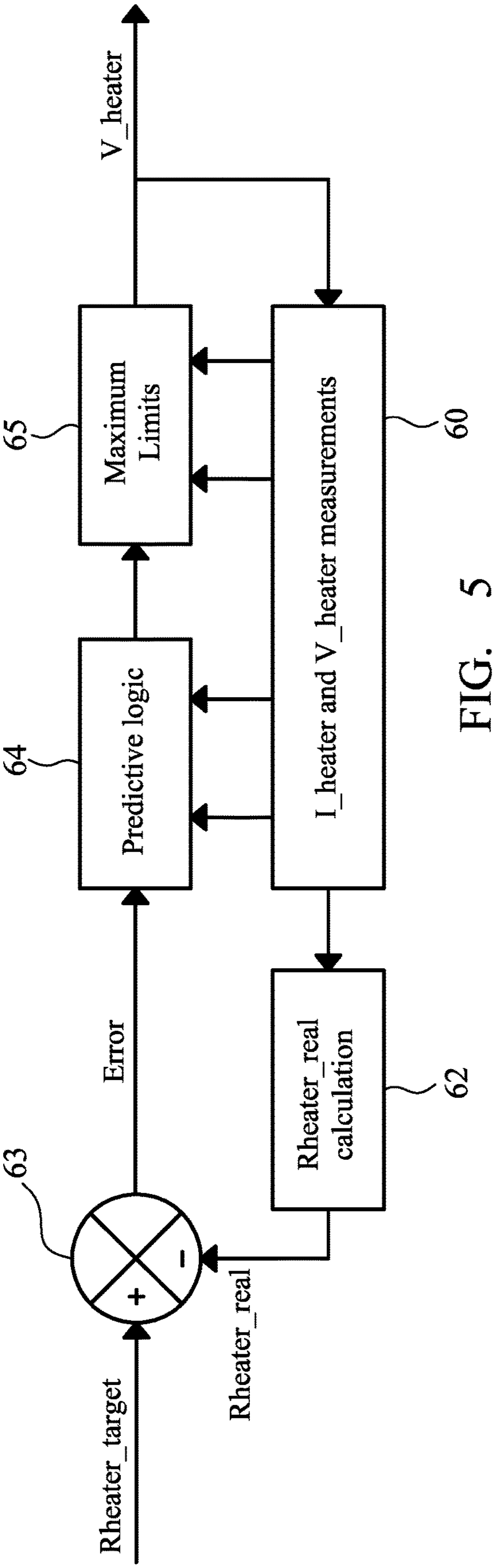
FIG. 5 illustrates a control loop using predictive logic for heater voltage.

FIG. 5 illustrates an alternative example of a closed loop control scheme that may be implemented by the microprocessor. In a first step 60, the measurement of the current through the heater and the measurement of Vheater are received and then a second step 62 they are used to calculate the electrical resistance of the heater. The calculated heater resistance is compared with the target resistance in step 63 and the difference is output to a predictive logic controller in step 64. The predictive logic controller can be based a model or ideal heater behaviour based on a plurality of parameters, such as temperature Vheater, time current and the error between the target resistance and the calculated resistance. As in the control loop of FIG. 4, before the output of the predictive logic controller is used to control the DC/DC converter it is first checked if the current or voltage through the heater or required output from the DC/DC converter is greater than predetermined maximum limits. If the current through the heater is greater than maximum current that the battery can deliver, then in step 65 the required value for Vheater is set to the product of the maximum allowable current and the calculated heater resistance. If the value of Vheater calculated by the predictive logic controller is greater than can be provided by the DC/DC converter, then Vheater is set to the maximum output voltage of the DC/DC converter.

It can be seen that the control of the DC/DC converter can be made to ensure that the current does not exceed a maximum permitted current above which the battery would be overloaded and which might cause the device to fail. The control unit can also ensure that the microcontroller always receives sufficient voltage from the battery. A microcontroller typically requires a minimum voltage in order to operate, such as 2.5 Volts.

It is desirable to bring the heater up to a first target temperature quickly so that the user does not have to wait a long time before a first puff. The higher the power applied to the heater, the faster its temperature will rise. When the device is first activated, the heater is typically at ambient temperature. For a heater with a positive temperature coefficient this means that it has a relatively low electrical resistance compared to its resistance during operation. At low temperature the battery also has a lower power output because its output voltage is reduced and because its internal resistance is increased, which reduces output current. This combination of factors means that at low temperatures, if the maximum power is extracted from the battery, then the battery voltage may be reduced to a level below the minimum operating voltage of the microcontroller.

As illustrated in FIG. 2, the device includes a voltage regulator 36 in order to regulate the voltage supplied from the battery to the microcontroller. The voltage regulator in this example is a linear dropout regulator (LDO) but may for example be a second DC/DC converter. The LDO in this example is configured to deliver a stable 2.5V to the microcontroller at all times. However, if the battery voltage drops below 2.5V then the LDO will not function properly.

This problem can be avoided by controlling the DC/DC converter during the first phase of the temperature profile. The microcontroller may be configured to continuously monitor the battery voltage and compare it to a reference voltage, typically 2.5V. If the battery voltage is higher than the reference voltage, the control signal changes the digital potentiometer value so that it increases the DC/DC output voltage. If the battery voltage is lower than the reference voltage, the control signal changes the digital potentiometer value so that it decreases the DC/DC output voltage. This corresponds to a controlled loop system in which the DC/DC output voltage is always at the maximum value it can be while ensuring that the battery voltage never falls below the minimum voltage of 2.5V. This method provides the fastest warm up of the heater for a given battery temperature.

Figure 6:
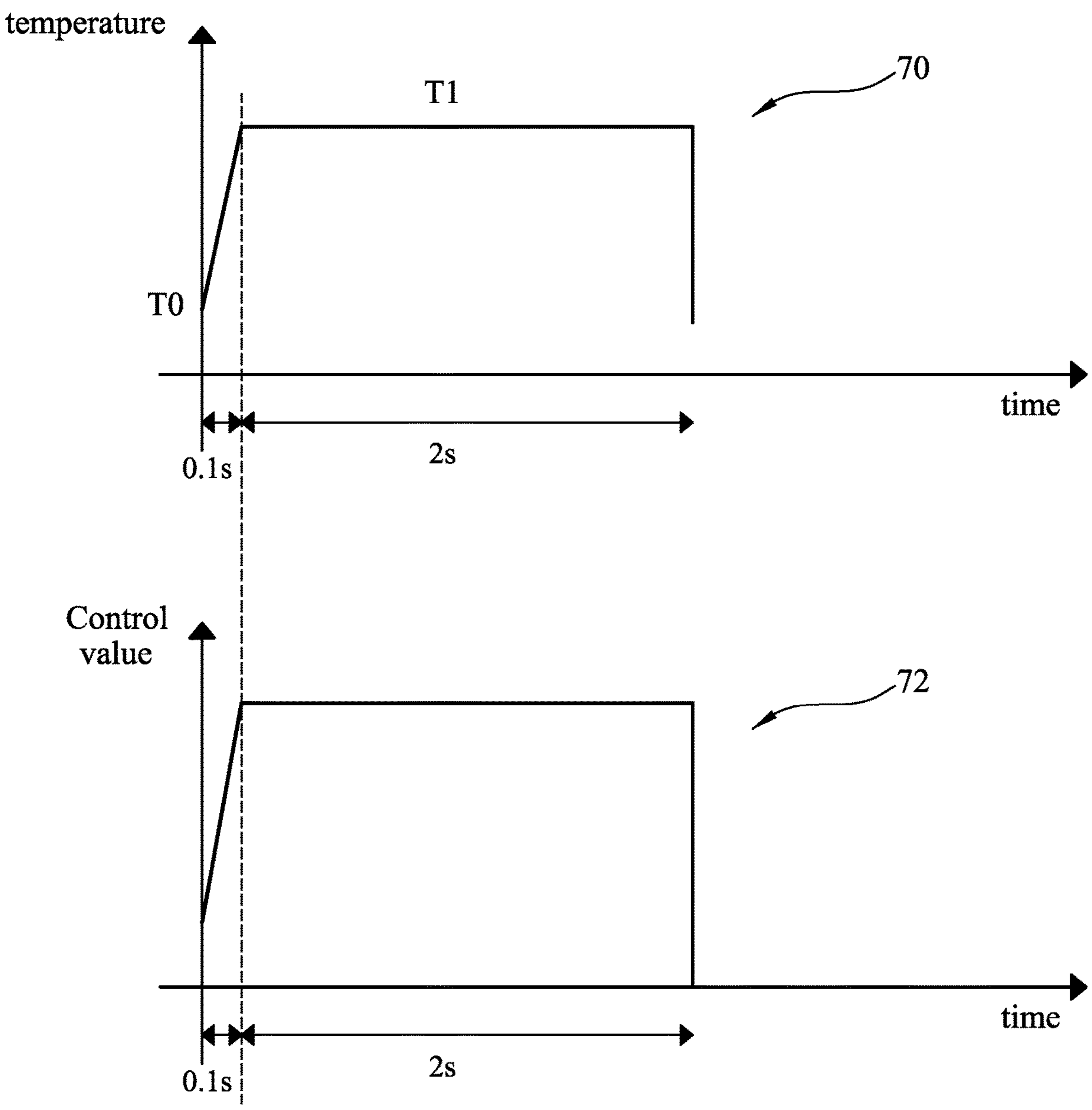
FIG. 6 illustrates another example temperature profile for the resistive heater and a corresponding voltage profile, suitable for a device that activates the heater only during user inhalations.

In some embodiments, an open loop control scheme for the DC/DC converter may be preferable. For example, the aerosol generating device of FIG. 1 may function by supplying power to a heater only in response to user inhalations. In between user inhalations no power is provided to the heater. In that case the temperature profile for the heater is much shorter, about 2 or 3 seconds only. There is no need for a complex temperature profile. The heater must reach the vaporization temperature as fast as possible, maintain it during 2 or 3 seconds, and then switch off. A temperature profile of this type is shown in FIG. 6 as graph 70. The relationship between temperature and heater resistance may be known or calibrated during manufacture and the temperature or resistance profile can be converted into a profile for the control value to be applied to the DC/DC feedback pin, as shown in graph 72. The profile is stored in a look up table in the microcontroller. The microcontroller controls the DC/DC converter through the digital potentiometer directly in open loop. The microcontroller may still receive and monitor Vheater and current measurements to detect abnormal or fault conditions, such as an exhausted substrate.

In addition to controlling the DC/DC converter in either an open loop or closed loop control scheme, the microcontroller may use pulse width modulation (PWM) to fine tune the temperature control of the heater. A switch, such as a MOSFET, may be connected in series with the heater and may be controlled by the microcontroller to modulate the current supplied to the heater. PWM may be used, for example, when the error between the target heater resistance and the calculated heater resistance is less than a threshold amount. Alternatively, or in addition, PWM may be used to provide for a fast response time, for example when the temperature is rising too fast.

The use of a DC/DC converter controlled according to a predetermined temperature or voltage profile has a number of advantages. The temperature profile of the heater is smoother than with PWM control and there is a much lower probability that the heater will instantaneously overheat. The required instantaneous current from the battery, particularly immediately after activating the device, is lower than when using PWM control, reducing the potential for problems of low battery voltage at low temperatures. Also, the use of a DC/DC converter allows for much greater flexibility in the design of the heater. For example, if a boosting DC/DC converter is used, then a higher resistance heater can be used, which may mitigate the impact of other resistances within the system, such as parasitic resistances and contact resistances.

The invention claimed is:

1. An aerosol-generating device for generation of an inhalable aerosol from a liquid aerosol-forming substrate, the aerosol-generating device comprising:
- a resistive heater;
- a battery, configured to generate a battery voltage (Vbat); and
- a control unit comprising:
  - a buck converter configured to receive as an input the battery voltage (Vbat) from the battery and to output an output voltage (Vheater) to the resistive heater, the output voltage (Vheater) being below the battery voltage (Vbat), and
  - a microcontroller configured to
    - control the buck converter to adjust the output voltage provided to the resistive heater to be below the battery voltage (Vbat),
    - monitor a current (Theater) through the resistive heater, and
    - control the buck converter to ensure that the current through the resistive heater does not exceed a maximum current threshold,
    - wherein the microcontroller is further configured to control the buck converter to ensure that the battery voltage (Vbat) is maintained at or above a minimum battery voltage.

2. The aerosol-generating device according to claim 1, wherein the microcontroller is further configured to operate a closed-loop control scheme.

3. The aerosol-generating device according to claim 2, wherein the microcontroller is further configured to operate a proportional integral derivative control scheme.

4. The aerosol-generating device according to claim 2, wherein the closed-loop control scheme operates within predefined Vheater and Iheater limits.

5. The aerosol-generating device according to claim 1, further comprising a means for measuring a temperature or a resistance of the resistive heater.

6. The aerosol-generating device according to claim 5, wherein the microcontroller is further configured to measure the temperature or resistance of the resistive heater based on Vheater and Iheater.

7. The aerosol-generating device according to claim 6, wherein the microcontroller is further configured to:
- determine an error between a target temperature or resistance for the resistive heater and the measured temperature or resistance of the resistive heater, and
- adjust the output voltage for the resistive heater based on the determined error.

8. The aerosol-generating device according to claim 1, wherein the microcontroller is further configured to operate an open-loop control scheme.

9. The aerosol-generating device according to claim 8, wherein the open-loop control scheme operates within predefined Vheater and Iheater limits.

10. The aerosol-generating device according to claim 1, wherein the battery is a lithium ion battery.

11. The aerosol-generating device according to claim 1, wherein the microcontroller is further configured to continuously supply current to the resistive heater from the buck converter for a period of more than 5 seconds.

12. The aerosol-generating device according to claim 1, wherein the microcontroller is further configured to control a supply of power to the resistive heater during a puff.

13. The aerosol-generating device according to claim 1, wherein the microcontroller is further configured to control the buck converter based on a measured or calculated resistance or temperature of the resistive heater.

14. The aerosol-generating device according to claim 1, wherein the microcontroller is further configured to control the buck converter to adjust the output voltage (Vheater) based on a predetermined temperature profile for the resistive heater that varies with time.

15. A method of controlling an aerosol-generating device to generate an inhalable aerosol from a liquid aerosol-forming substrate,
- the aerosol-generating device comprising:
  - a resistive heater,
  - a battery configured to generate a battery voltage (Vbat), and
  - a control unit comprising a buck converter configured to receive as input the battery voltage (Vbat) from the battery and to output an output voltage (Vheater) to the resistive heater, the output voltage (Vheater) being below the battery voltage (Vbat); and
- the method comprising:
  - controlling the buck converter to adjust an output voltage (Vheater) provided to the resistive heater to be below the battery voltage (Vbat),
  - monitoring a current through the resistive heater,
  - controlling the buck converter to ensure that the current through the resistive heater does not exceed a maximum current threshold, and
  - controlling the buck converter to ensure that the battery voltage (Vbat) is maintained at or above a minimum battery voltage.

* * * * *